United States Patent
Kosch

[11] Patent Number: 6,082,168
[45] Date of Patent: Jul. 4, 2000

[54] APPARATUS FOR ROTATING A HORIZONTALLY DISPOSED, CYLINDRICAL WORKPIECE

[75] Inventor: Delmar D. Kosch, Columbus, Nebr.

[73] Assignee: Fremont Machine & Tool, Inc., Fremont, Nebr.

[21] Appl. No.: 09/364,221

[22] Filed: Jul. 29, 1999

[51] Int. Cl.$^7$ ..................................................... B21J 13/10
[52] U.S. Cl. ................................................. 72/420; 72/306
[58] Field of Search ............................. 72/298, 299, 301, 72/306, 307, 311, 447, 420, 422; 414/757, 771, 781, 783

[56] References Cited

U.S. PATENT DOCUMENTS

| | | | |
|---|---|---|---|
| 4,662,204 | 5/1987 | Saegusa | 72/306 |
| 4,805,436 | 2/1989 | Saegusa | 72/306 |
| 4,945,747 | 8/1990 | Yogo | 72/306 |
| 5,291,771 | 3/1994 | Tomo et al. | 72/306 |
| 5,566,565 | 10/1996 | Saegusa | 72/306 |

*Primary Examiner*—Ed Tolan
*Attorney, Agent, or Firm*—Zarley, McKee, Thomte Voorhees & Sease; Dennis L. Thomte

[57] ABSTRACT

A rotator is disclosed for precisely rotating a horizontally disposed, cylindrical workpiece comprising first and second workpiece rotator members which are vertically disposed and horizontally spaced-apart. Each of the workpiece rotator members has a gear rack provided at its lower inner end which is in mesh with a driven gear or shaft so that rotation of the shaft in one direction causes the first workpiece rotator member to move upwardly with the second workpiece rotator member being moved downwardly in a corresponding and equal amount. When the driven shaft or gear is moved in a direction opposite to that described, the first workpiece rotator member is moved downwardly while the second workpiece rotator member is moved upwardly. The workpiece is positioned between the workpiece rotator members and precisely rotated in either clockwise or counterclockwise directions so that the proper bends may be imparted to the workpiece after the workpiece has been rotated.

9 Claims, 8 Drawing Sheets

APPARATUS FOR ROTATING A HORIZONTALLY DISPOSED, CYLINDRICAL WORKPIECE

BACKGROUND OF THE INVENTION

1. Field of the Invention

This invention relates to an apparatus for rotating a horizontally disposed, cylindrical workpiece and more particularly to an apparatus which is used in a wire, rod or tube bending machine for rotating the same into position to facilitate the proper bending thereof.

2. Description of the Related Art

Many types of wire, rod or tube bending machines have been previously provided. In the prior art machines, a cylindrical wire, rod or tube (workpiece) is held in place while bends are created therein. In many cases, it is necessary to rotate the workpiece during the bending operation so that a plurality of bends may be created in the workpiece with those bends being offset with respect to other bends. In other words, the bending machine may create a first bend in the workpiece with it then being necessary to rotate the workpiece about its longitudinal axis in a predetermined amount to enable subsequent bends to be created in the workpiece. One of the many problems associated with the prior art bending machines is that they do not provide a truly reliable and accurate means for rotating the cylindrical workpiece about its longitudinal axis in a precise manner. For example, after a first bend is formed in the workpiece, it may be necessary to rotate the workpiece about its longitudinal axis 13° so that a second bend may be formed therein. If the workpiece is not held in its proper position during rotation thereof, the second or subsequent bends will not be accurately formed.

Although many previous devices have been provided for rotating the workpiece between the bends being formed therein, it is believed that none of the prior art devices accurately maintain the workpiece in position during the rotation thereof which causes errors to be incorporated therein. In other words, if it is desired to rotate the workpiece 13°, and some vertical or horizontal movement is imparted thereto during the rotation thereof, the subsequent bend or bends will not be accurately created in the workpiece.

SUMMARY OF THE INVENTION

An apparatus in the form of a rotator is disclosed for rotating a horizontally disposed, cylindrical workpiece such as a wire, rod or tubular member, comprising a support; a first workpiece rotator member mounted in the support which has an upper end, a lower end, opposite sides, an inner end, and an outer end; a second workpiece rotator member mounted on the support which has an upper end, a lower end, opposite sides, an inner end, and an outer end; the first and second workpiece rotatable members being substantially vertically disposed and horizontally spaced-apart so that at least the upper inner ends thereof are normally spaced from one another; and with the first and second workpiece rotator members being vertically movably mounted on the support. The first and second workpiece rotator members have first and second inwardly presented gear racks at their inner ends, respectively. A rotatable driven gear is in mesh with the gear racks on the workpiece rotator members and is selectively rotatable in first and second directions. The rotation of the driven gear in its first direction causes the first workpiece rotator member to move upwardly with respect to the support and also causes the second rotator member to move downwardly with respect to the support. The rotation of the driven gear in its said second direction causing the first workpiece rotator member to move downwardly with respect to the support and causing the second workpiece rotator member to move upwardly with respect to the support. A power means such as a computer-controlled servomotor or the like is provided for selectively rotating the driven gear in its first and second directions. A means is provided for supplying the workpiece to the upper inner ends of the workpiece rotator members. Further, means is provided for moving at least one of the workpiece rotator members outwardly with respect to the other workpiece rotator member so that the workpiece may be positioned between the upper inner ends of the workpiece rotator members. Means is also provided for moving at least one of the workpiece rotator members inwardly with respect to the other workpiece rotator member so that the workpiece may be clamped between the upper inner ends of the workpiece rotator members. The rotation of the driven gear in its first direction causing the workpiece to be rotated about its axis in a first direction without any horizontal or vertical movement thereof. The rotation of the driven gear in its second direction causing the workpiece to be rotated about its axis in a second direction without any horizontal or vertical movement thereof.

It is therefore a principal object of the invention to provide an improved rotator apparatus for rotating a horizontally disposed, cylindrical workpiece.

Yet another object of the invention is to provide a device of the type described above which enables cylindrical workpieces to be precisely rotated to enable bends to be created therein at the proper axial location.

Still another object of the invention is to provide a rotator apparatus for rotating a horizontally disposed, cylindrical workpiece which precisely and securely grips and rotates the workpiece in the proper amount.

Still another object of the invention is to provide a rotator apparatus for rotating a horizontally disposed, cylindrical workpiece wherein the workpiece is not moved vertically, but is rotated upon its own axis.

Still another object of the invention is to provide a rotator apparatus for rotating a horizontally disposed, cylindrical workpiece which is economical of manufacture, durable in use and refined in appearance.

These and other objects of the invention will be apparent to those skilled in the art.

DESCRIPTION OF THE PREFERRED EMBODIMENT

Figure 1:
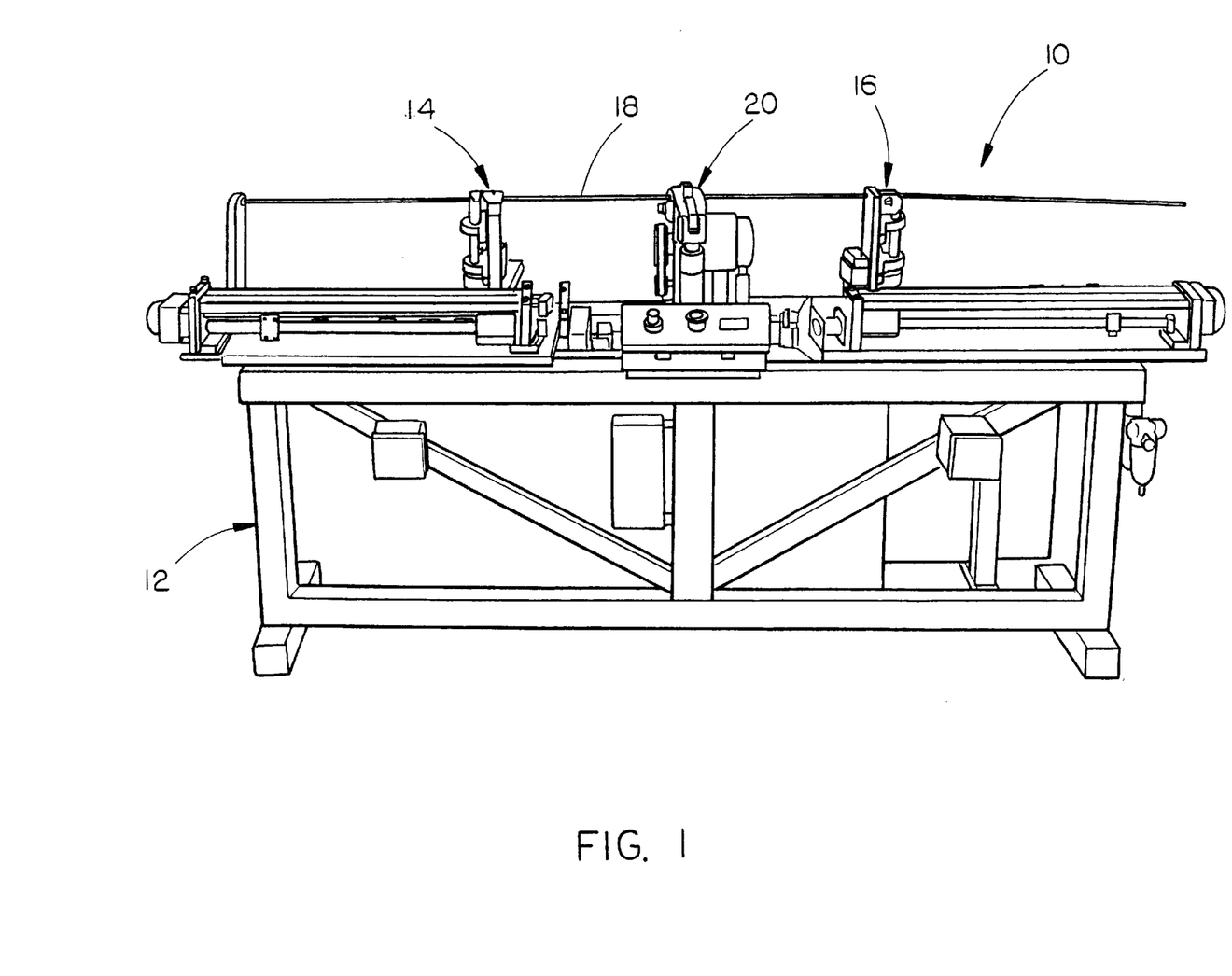
FIG. 1 is a perspective view of a workpiece bending machine upon which the rotator apparatus of this invention is mounted.
Figure 2:
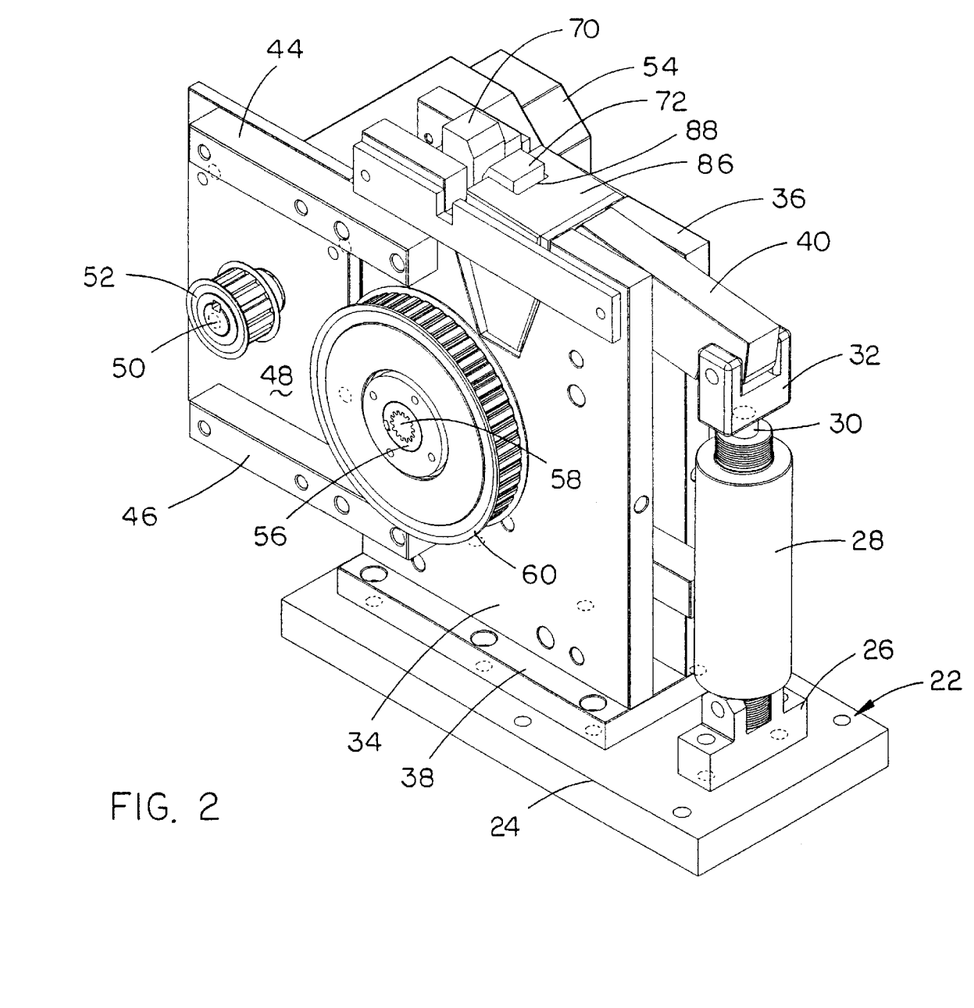
FIG. 2 is a perspective view of the rotator apparatus of this invention.
Figure 3:
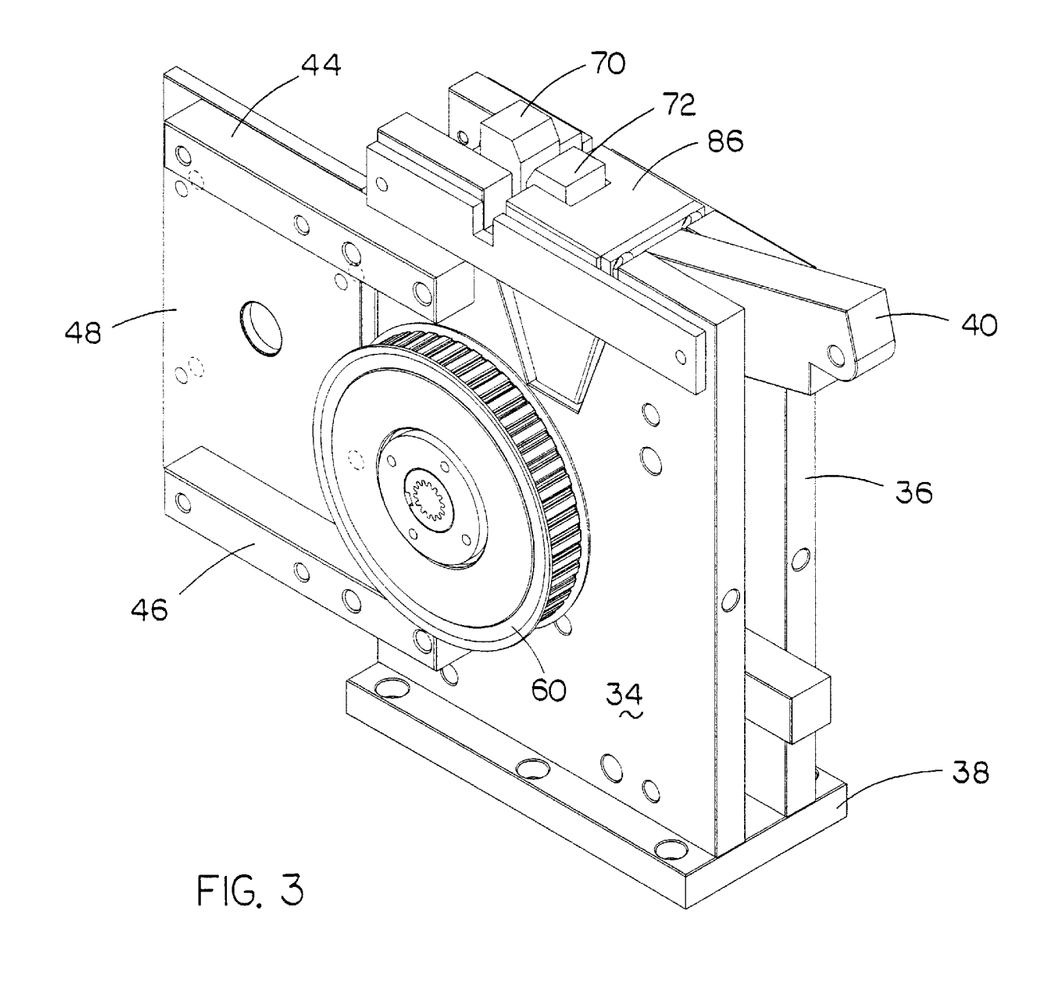
FIG. 3 is a view similar to FIG. 2 except that certain components have been removed therefrom to more clearly illustrate the invention.
Figure 4:
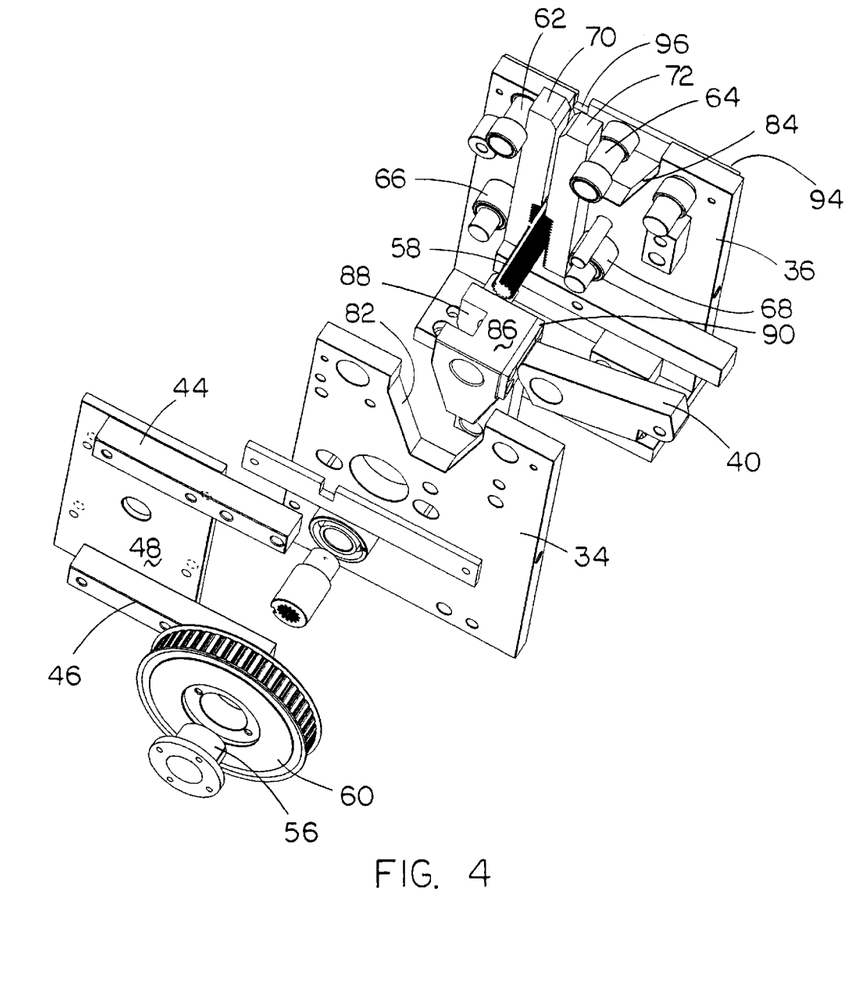
FIG. 4 is a partial exploded perspective view of the rotator apparatus of this invention.
Figure 5:
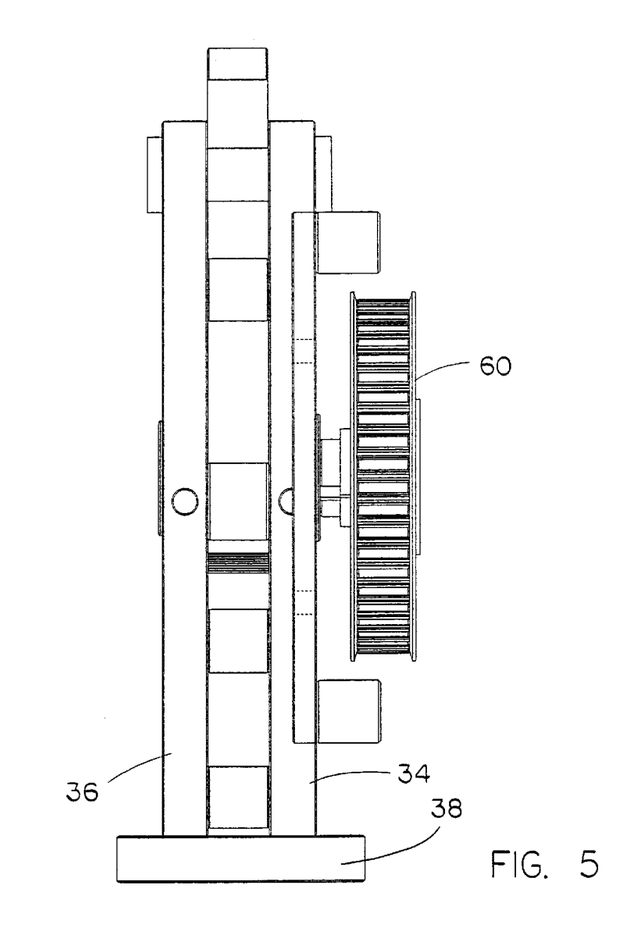
FIG. 5 is a partial side view of the rotator apparatus of this invention.
Figure 6:
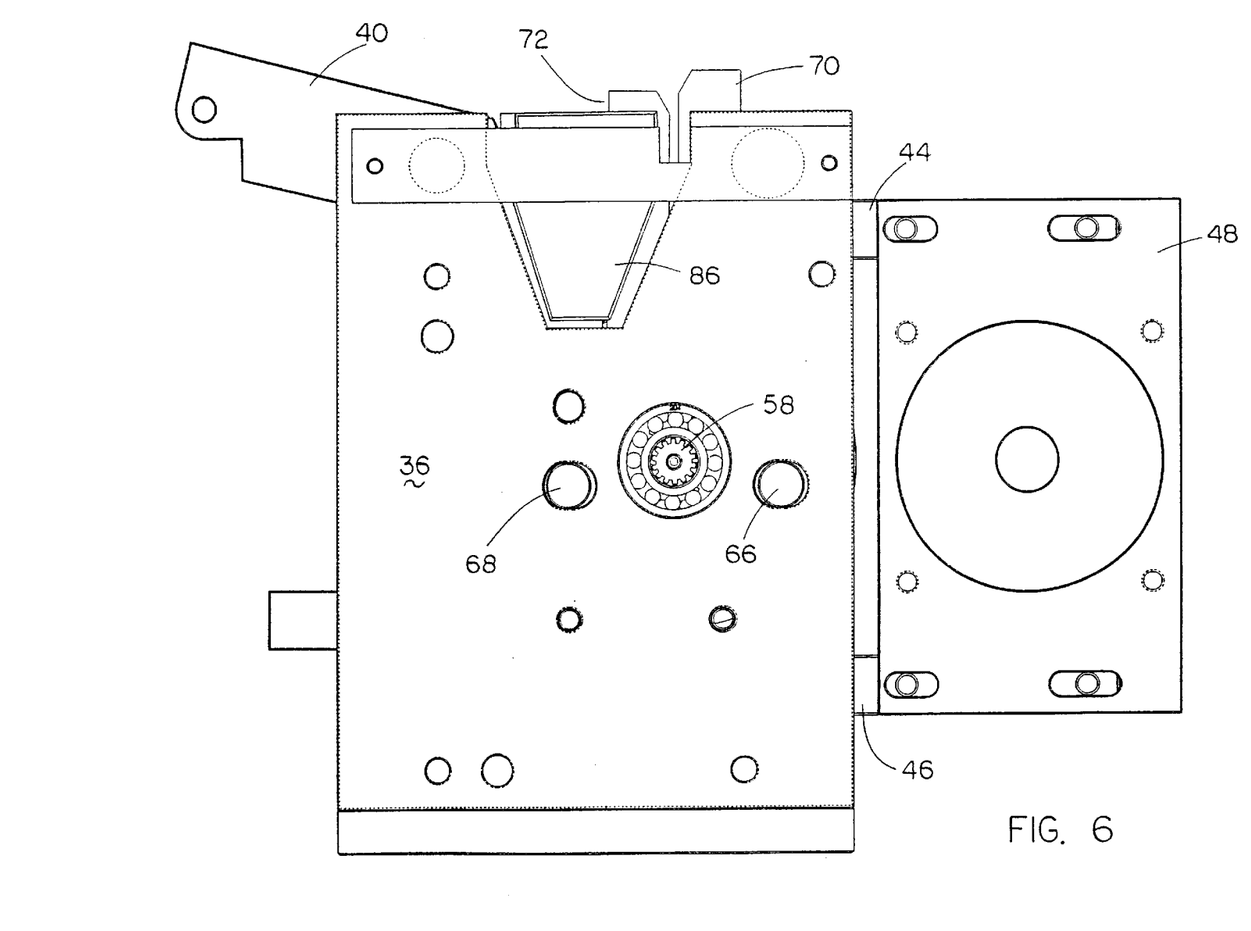
FIG. 6 is a rear elevational view of the rotator apparatus of this invention with certain components having been removed therefrom to more clearly illustrate the invention.
Figure 7:
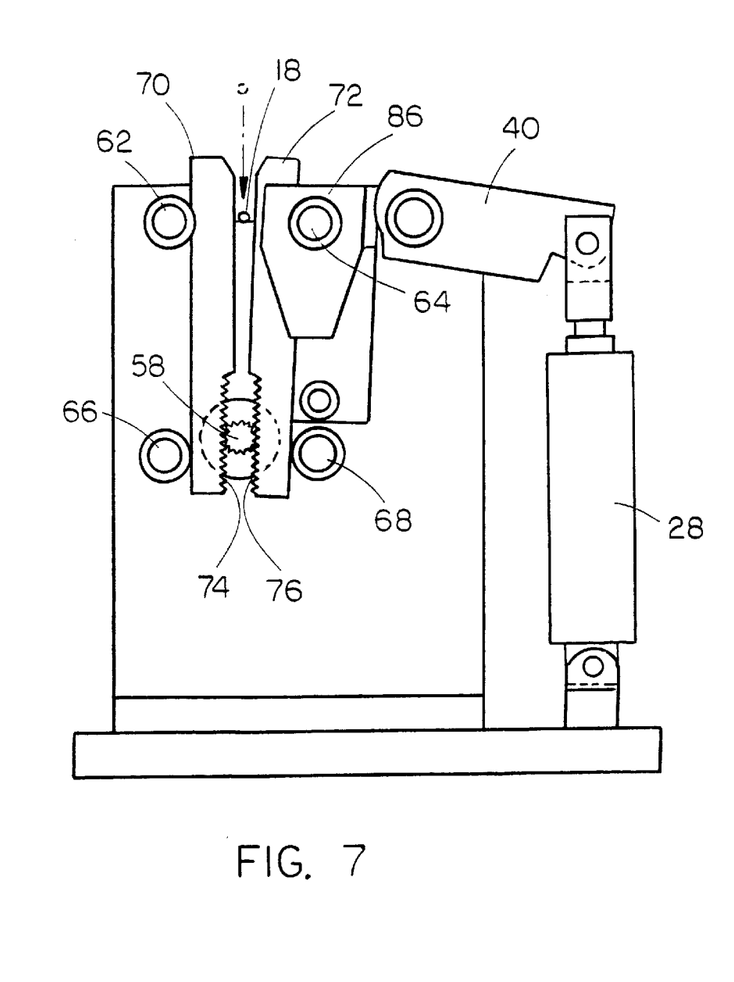
FIG. 7 is a partial front view of the rotator apparatus illustrating the workpiece being placed between the rotator members.

The numeral 10 refers generally to a workpiece bending machine designed to bend workpieces such as elongated wires, rods or tubular members into the desired shape. Bending machine 10 generally includes a support means 12 designed to be supported upon the floor or the like and having a pair of bending heads 14 and 16 movably mounted thereon. The bending heads 14 and 16 are selectively longitudinally movably mounted on the support 12 to bend the elongated member 18 in the desired amount and at the proper radial orientation as dictated by the machine. The numeral 20 refers to the rotator apparatus of this invention which is designed to rotate the workpiece 18 in the proper amount so that the bending heads 14 and 16 may create the proper bends in the workpiece 18 in the proper axial orientation. It is not believed that the prior art bending machines have the capability of precisely rotating the workpiece 18 about its longitudinal axis, without imparting vertical movement thereof, which will cause bending errors to creep into the finished product. Further, it is not believed that the prior art devices include means for conveniently positioning the workpiece 18 therein and for ensuring that the workpiece 18 is rotated in the proper amount. Although the invention disclosed herein is particularly well-suited for use with a bending machine, the rotating apparatus of this invention is suited for use in rotating any cylindrical member which requires precise rotational movement.

Rotator apparatus 20 generally includes a support 22 which is secured to the machine 10 and which extends normally upwardly therefrom. Support 22 includes a substantially flat base plate 24 which is bolted or otherwise secured to the bending machine 10. Pivot bracket 26 is secured to the base plate 24 and has the base end of an air cylinder 28 pivotally secured thereto. The cylinder rod or shaft 30 of the cylinder 28 has a yoke 32 secured to the upper end thereof.

Support 20 also includes a pair of vertically disposed plates 34 and 36 which extend upwardly from plate 38 which is secured to plate 24, as illustrated in the drawings. Cam pivot arm 40 is pivotally secured to and positioned between the plates 34 and 36, as illustrated in the drawings, and has its outer end pivotally secured to the yoke 32 at 42.

Arms 44 and 46 are secured to plate 34 in a vertically spaced manner and have plate 48 secured thereto. Shaft 50 is rotatably mounted in plate 48 and has belt pulley 52 mounted thereon for rotation therewith. Shaft 50 is rotated by any suitable power means, such as a servomotor 54, which is preferably computer-controlled so that the rotation of shaft 50 is precisely controlled. Although a servomotor 54 is the preferred means for rotating the shaft 50, shaft 50 could be rotated by other suitable means provided the rotation of shaft 50 is precisely controlled. Hub 56 is rotatably mounted on plate 34 and has a driven shaft or gear 58 received therein so that rotation of hub 56 will cause rotation of the driven gear or shaft 58. Hub 56 operatively supports belt pulley 60. Although not shown, a conventional belt extends around pulley 52 and pulley 60 so that rotation of shaft 50 causes rotation of the pulley 60 and shaft 58.

Shaft 62 is rotatably mounted in and extends between plates 34 and 36, as illustrated in the drawings, as does shaft 64. Spring-mounted guide rollers 66 and 68 are positioned between the plates 34 and 36 below shafts 62 and 64, respectively, and are urged inwardly towards one another by means of springs. A pair of horizontally spaced and vertically disposed rotator members 70 and 72 are positioned between plates 34 and 36 and have inwardly presented gear racks 74 and 76 provided at the lower inner ends thereof which are in mesh with the driven gear or shaft 58, as illustrated in the drawings. The rotator members 70 and 72 have beveled upper inner ends, as seen in the drawings and which are referred to generally by the reference numerals 78 and 80, respectively. The upper outer ends of the rotator members 70 and 72 are in engagement with the shafts 62 and 64, as illustrated in the drawings. The lower outer ends of the rotatable members 70 and 72 are in engagement with the guide rollers 66 and 68, respectively, as also seen in the drawings. The inward spring tension of the guide rollers 66 and 68 urges the teeth of the gear racks 74 and 76 into positive engagement with the teeth of the driven gear or shaft 58 so as to eliminate any backlash in the gear connection of the shaft 58 and the gear racks 74 and 76.

The upper end of plate 34 is provided with a recessed area 82 formed therein while the upper end of plate 36 is provided with a recessed area 84 formed therein. Recessed areas 82 and 84 are adapted to movably receive the guide block 86 therein which has an inwardly presented channel 88 formed therein which receives the upper outer end of rotatable member 72. A wear plate 90 is provided on the outer surface of guide block 86 which is in engagement with the inner cam surface of the cam arm 40. Thus, when the shaft or rod 30 of the air cylinder 28 is extended, the member 86 causes the rotator member 72 to be urged towards rotator member 70 due to the inward force being applied to guide block 86 by the cam arm 40. When the shaft or rod 30 of the air cylinder 28 is retracted, the inner end of cam arm 40 pivots upwardly, which permits the upper end of rotator member 72 to move outwardly with respect to the inner end of the rotator member 70 so that the workpiece 18 may be inserted therebetween. As the shaft 30 is retracted into cylinder 28, the spring tension on the guide roller 68 against the lower outer end of rotator member 72 causes the upper end of rotator member 72 to move outwardly or away from the upper end of rotator member 72.

Figure 8:
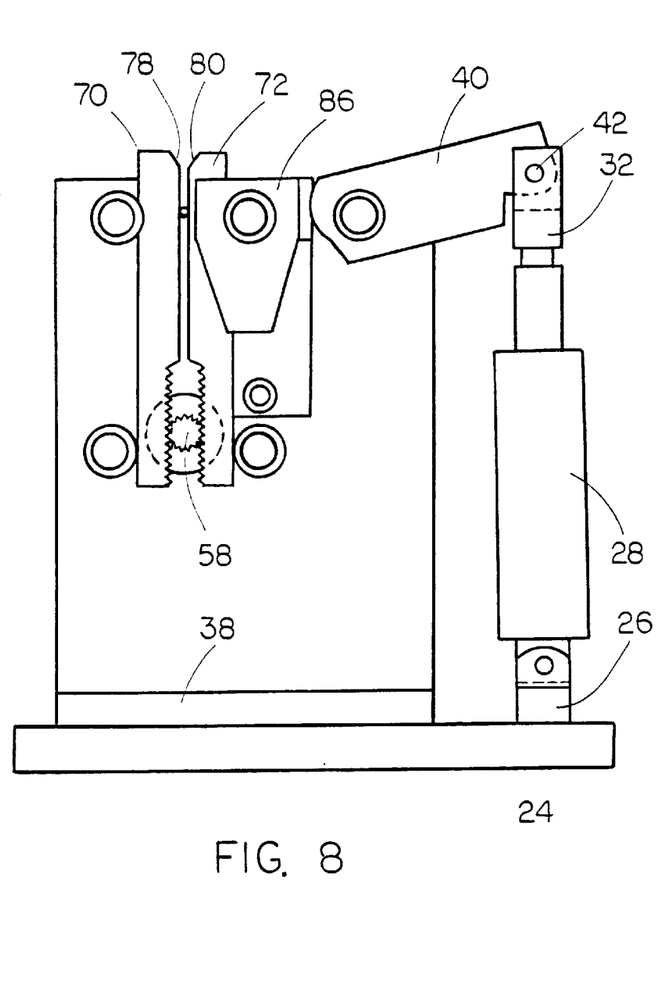
FIG. 8 is a view similar to FIG. 7 except that the workpiece has been clamped into position.
Figure 9:
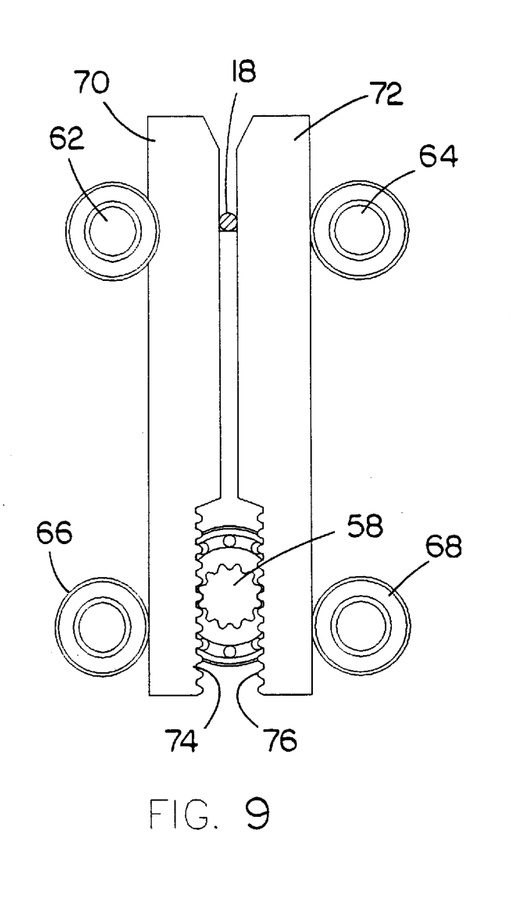
FIG. 9 is a schematic view illustrating the workpiece having been clamped into position between the rotator members.
Figure 10:
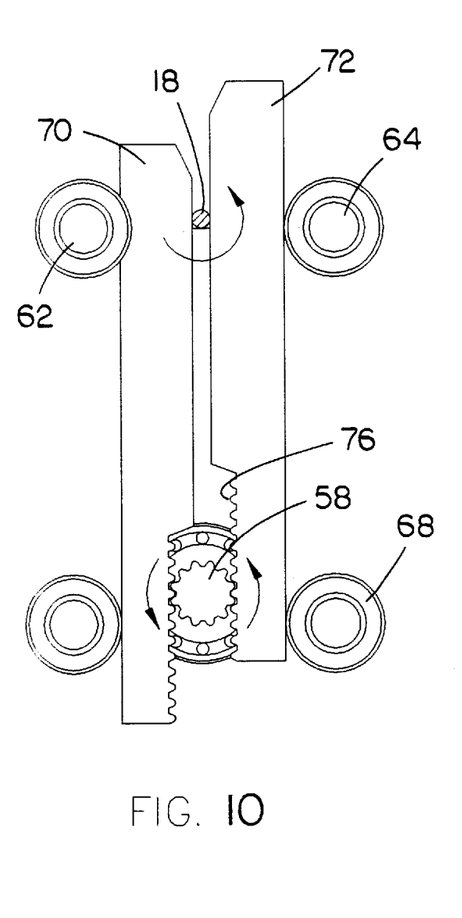
FIG. 10 is a view similar to FIG. 9 except that the workpiece has been rotated in a counterclockwise direction.
Figure 11:
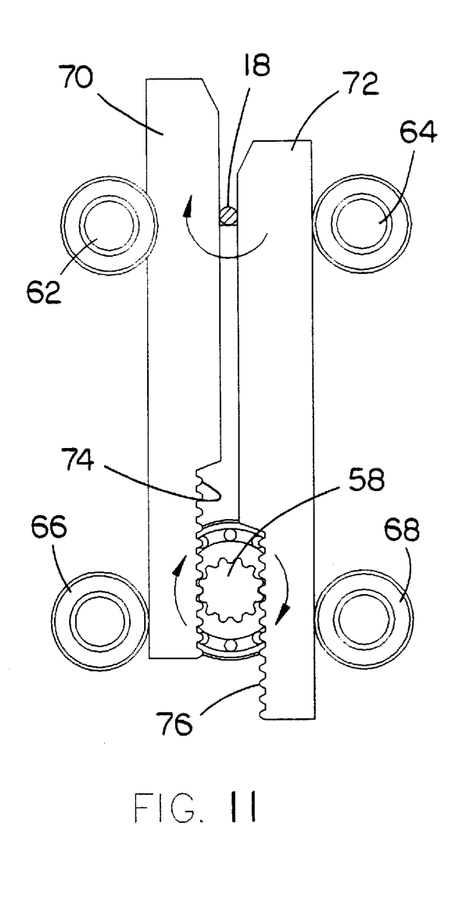
FIG. 11 is a view similar to FIG. 9 except that the workpiece has been rotated in a clockwise direction.

In operation, when it is desired to bend a workpiece 18 such as a rod, wire or tubular member, air cylinder 28 is retracted so that the upper end of rotator member 72 moves away from the upper end of rotator member 70. At that time, the elongated cylindrical workpiece 18 is lowered or dropped downwardly between the beveled upper ends 78 and 80 of the rotator members 70 and 72, respectively, with the downward movement thereof being limited by the plate 94 which has a notch 96 formed therein. When the elongated workpiece 18 has been dropped downwardly between the rotator members 70 and 72 and supported by the notch 96 in the plate 94, the air cylinder 28 is extended which causes the cam arm 40 to move the guide block 86 inwardly which, in turn, causes the upper end of rotator member 72 to move towards rotator member 70 so that the workpiece 18 is positively clamped or positioned between the rotator members 70 and 72 (FIG. 8). With the workpiece 92 clamped into position, rotation of the driven shaft or gear 58 in a clockwise direction, as viewed in FIG. 11, causes rotator member 70 to be raised with respect to the plates 34 and 36 and causes the rotator member 72 to be lowered with respect to the plates 34 and 36 in an equal amount which causes the workpiece 18 to be rotated in a clockwise direction, as viewed in FIG. 11, in an amount controlled by the servomotor 54, without the workpiece 18 being moved vertically. Conversely, rotation of the driven gear or shaft 58 in a counterclockwise direction (FIG. 10) causes the rotator member 70 to be moved downwardly with the rotator member 72 being moved upwardly in an equal amount, thereby causing the workpiece 18 to be rotated about its axis in a counterclockwise direction without any vertical movement being imparted thereto.

The precise and positive rotational movement of the workpiece 18 about its axis without any vertical movement being imparted thereto ensures that the workpiece 18 will be rotated in the precise amount so that the proper bend may be created in the workpiece when the workpiece has been so positioned.

After the workpiece 18 has been rotated and bent to create the proper configuration thereto, the air cylinder 28 is retracted so that the upper end of rotator member 72 is moved outwardly with respect to rotator member 70 to enable the workpiece 18 to be removed from the device.

Thus it can be seen that a novel rotator apparatus has been provided for rotating a horizontally disposed, cylindrical workpiece wherein the workpiece is precisely rotated in the proper manner without any slippage or vertical movement.

It can therefore be seen that the invention accomplishes at least all of its stated objectives.

I claim:

1. A rotator apparatus for rotating a horizontally disposed, cylindrical workpiece, comprising:

a support;

a first workpiece rotator member having an upper end, a lower end, opposite sides, an inner end, and an outer end;

a second workpiece rotator member having an upper end, a lower end, opposite sides, an inner end, and an outer end;

said first and second workpiece rotator members being substantially vertically disposed and horizontally spaced-apart so that at least the upper inner ends thereof are normally spaced from one another;

said first and second workpiece rotator members being vertically movably mounted on said support;

said first workpiece rotator member having a first inwardly presented gear rack at its inner end;

said second workpiece rotator member having a second inwardly presented gear rack at its inner end;

a rotatable driven gear in mesh with said gear racks on said workpiece rotator members and being selectively rotatable in first and second directions;

the rotation of said driven gear in its said first direction causing said first workpiece rotator member to move upwardly with respect to said support and causing said second workpiece rotator member to move downwardly with respect to said support;

the rotation of said driven gear in its said second direction causing said first workpiece rotator member to move downwardly with respect to said support and causing said second workpiece rotator member to move upwardly with respect to said support;

power means for selectively rotating said driven gear in its said first and second directions;

means for moving at least one of said workpiece rotator members outwardly with respect to the other workpiece rotator member so that a workpiece may be positioned between said inner ends of said workpiece rotator members;

means for moving at least one of said workpiece rotator members inwardly with respect to the other workpiece rotator member so that the workpiece may be clamped between said inner ends of said workpiece rotator members;

the rotation of said driven gear in its said first direction causing the workpiece to be rotated about its axis in a first direction without any horizontal or vertical movement thereof;

the rotation of said driven gear in its said second direction causing the workpiece to be rotated about its axis in a second direction without any horizontal or vertical movement thereof.

2. The rotator apparatus of claim 1 wherein said gear racks are formed on the lower inner ends of said workpiece rotator members.

3. The rotator apparatus of claim 1 wherein said power means comprises a servomotor.

4. The rotator apparatus of claim 3 wherein said servomotor is computer-controlled.

5. The rotator apparatus of claim 1 wherein said means for moving said at least one workpiece rotator member inwardly and outwardly comprises a power cylinder.

6. The rotator apparatus of claim 5 wherein said power cylinder is an air cylinder.

7. The rotator apparatus of claim 1 further including means for preventing backlash between said gear racks and said driven gear.

8. The rotator apparatus of claim 1 further including means for limiting the downward vertical movement of the workpiece between said first and second workpiece rotator members.

9. The rotator apparatus of claim 5 wherein said power cylinder is operatively connected to a cam arm which is pivotally mounted on said support; said cam arm being operatively connected to said one workpiece member.

* * * * *